United States Patent [19]
Goodson et al.

[11] 3,715,298
[45] Feb. 6, 1973

[54] AIR POLLUTION MONITORING SYSTEM

[75] Inventors: Louis H. Goodson, Kansas City; William B. Jacobs, Independence, both of Mo.; Andrew W. Davis, Baltimore, Md.

[73] Assignee: The United States of America as represented by the Secretary of the Army

[22] Filed: Dec. 22, 1970

[21] Appl. No.: 100,741

[52] U.S. Cl. .........204/195 B, 204/195 R, 195/103.5
[51] Int. Cl. .............................................G01n 27/28
[58] Field of Search ..324/29; 204/195 R, 1 T, 195 B; 23/232 E, 254 E; 195/103.5

[56] References Cited

UNITED STATES PATENTS

| | | | |
|---|---|---|---|
| 3,451,901 | 6/1969 | Seiger et al. | 204/1 T |
| 2,862,859 | 12/1958 | Grosskopf | 204/1 T |
| 2,805,191 | 9/1957 | Hersch | 204/1 T |
| 3,314,864 | 4/1967 | Hersch | 204/1 T |
| 3,403,081 | 9/1968 | Rohrback et al. | 204/1 T |

*Primary Examiner*—G. L. Kaplan
*Attorney*—Harry M. Saragovitz, Edward J. Kelly, Herbert Berl and Bernard J. Ohlendorf

[57] ABSTRACT

A system and method for continuous monitoring of an airstream for the presence of pollutants therein by effective absorbtion of the pollutants in an absorbing solution by creating turbulent flow of the airstream and the absorbing solution prior to passing the absorbing solution containing the pollutants to an electrochemical cell whereby any electrical change produced in the electrodes of the electrochemical cell denotes the presence of pollutants; any electrical change being proclaimed by conventional means.

11 Claims, 1 Drawing Figure

PATENTED FEB 6 1973 3,715,298
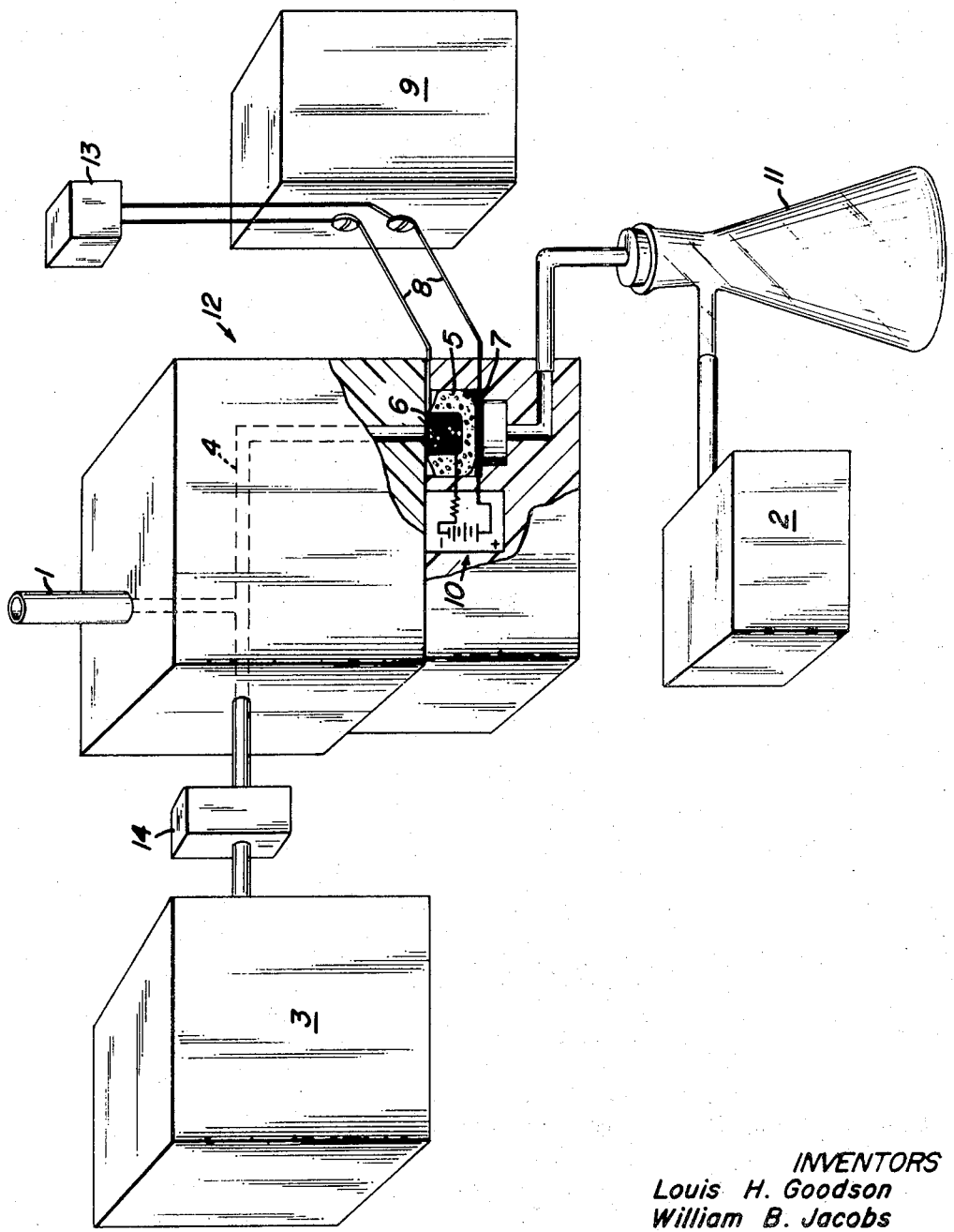
INVENTORS
Louis H. Goodson
William B. Jacobs
Andrew W. Davis
BY
Harry M. Saragovitz
Edward J. Kelly
Herbert Berl
Bernard J. Ohlendorf
ATTORNEYS

AIR POLLUTION MONITORING SYSTEM

DEDICATORY CLAUSE

The invention described herein may be manufactured, used, and licensed by or for the Government for governmental purposes without the payment to us of any royalty thereon.

Our invention relates to a system and method for continuous monitoring of airstreams for the presence of various types of pollutants; such as reducing substances, enzyme inhibiting substances, and oxidizing substances. It consists of a surveillance program and a declaring program.

In connection with the surveillance program, prior art analytical chemical analyses were conducted by means such as polarography, coulometry, chronopotentiometry, amperometry, and similar electrochemical analysis which involved the use of a static or stirred solution in which constant amounts of substances to be analyzed were reduced, oxidized, plated, polarized or otherwise used to produce an endpoint which could be related to the quantity of substance present which was being analyzed. However, it was not possible to conduct the aforementioned prior art electrochemical operations on a continuous basis or to produce results available on a real time basis. Our invention was conceived and reduced to practice to solve the above described problem and to satisfy the long felt need for a system and method having a sufficient sensitivity and speed of response to enable airborne and/or aerosolized substances present in trace amounts to be detected and/or quantitated in a matter of a few seconds.

A principle object of our invention is to provide a system and method to detect and/or quantitate trace amounts of airborne and/or aerosolized substances in a few seconds.

Another object of our invention is to provide a system and method to monitor the difference in level of pollutants in two or more airstreams.

Other objects will be obvious from or will appear in the specification hereinafter set forth.

The drawing shows our system for monitoring any airborne and/or aerosolized pollutants and will now be described in detail as follows.

An airstream to be monitored is drawn into inlet 1 by means of conventional air pump 2; pump 2 also serving to circulate the airstream and below described absorbing solution through the system after absorption in conduit 4. Simultaneously, an absorbing solution is drawn from reservoir 3 by auxiliary pump 14 to mix with the airstream in conduit 4, an optimum small diameter conduit of about 0.070 of an inch inside diameter. Due to the airstream and absorbing solution passing from an airstream larger diameter conduit of about 0.090 of an inch to conduit 4, turbulence is produced in the airstream and absorbing solution flow through conduit 4 which results in effective and efficient scrubbing of the airstream and absorbing of any pollutants in the airstream by the absorbing solution; conduit 4 being designed to be utilized with a cathode of 0.157 of an inch diameter and a ⅝ of an inch diameter anode. While particular conduit and electrode sizes have been stated, the stated sizes are merely exemplary, and suitable sizes for a particular application are selectable within the skill of the art. The only size criticality is that the airstream enter a smaller size conduit from a larger size conduit to produce turbulent flow. The solution containing any absorbed pollutant is taken up by open-cell material 5, such as urethane foam, located between any suitable and conventional electrodes, such as gray platinum cathode 6 and gray platinum anode 7; material 5 permitting a film flow of solution between electrodes 6 and 7 to produce rapid electrode response. Electrodes 6 and 7 can be made of either the same electrode materials or different electrode materials in the conventional manner to suit a given application within the skill of the art. Material 5 can also be used as a support for materials to suit a given application within the skill of the art, such as a catalyst or an enzyme. Aforementioned solution containing any pollutant acts as an electrolyte, and the potential or current of electrodes 6 and 7 are proclaimed in the declaring program by connecting lead wires between the electrodes and a conventional recording means 9. An electrical current is passed through electrodes 6 and 7 by the circuit shown at 10 in the conventional manner; the current being passed as shown in the drawing when similar electrode materials are used and by the galvanic current produced within the electrodes and without the necessity for circuit 10 when dissimilar electrode materials are used. The airstream with pollutants removed and the absorbing solution containing the pollutants is continued to be drawn through the system by pump 2 to collect the absorbing solution in trap 11 and to exhaust the airstream with pollutants removed from pump 2 in the conventional manner. In addition to connecting our system to a recording means in the declaring program, it can also be connected to a visual, such as a flashing light, and/or audible alarm 13 in the conventional manner whereby the alarm is activated when there is a rise or fall of the potential of electrodes 6 and 7 above or below, respectively, a predetermined characteristic base line voltage for an unpolluted airstream. A plurality of our surveillance programs can be connected to a multi-channel recording means in the conventional manner and operated simultaneously to monitor any difference in the levels of pollutants in the airstreams of a plurality of locations. The housing shown at 12 for our electrochemical cell component, reservoir 3, conduit 4, and trap 11 can be made of any conventional or suitable materials to suit a given application, such as plastic or glass. Exemplary examples of the utilization of our above described system are as follows.

EXAMPLE 1

This example demonstrates the detection and/or monitoring of reducing substances in an airstream. An airstream is drawn into the above described system at a rate of 2 liters/min., and a solution of buffer, having a pH of approximately 8, is pumped into the system from reservoir 3 at the rate of 0.1 to 0.3 ml/min by means of peristaltic pump 2 as described above. An electrical circuit 10 is attached to electrodes 6 and 7 to cause a current of approximately $2\mu A$ to flow through open-cell urethane foam pad 5, approximately ¼ inch thick and ⅝ inch in diameter, to provide a means of measuring the potential which is developed at electrodes 6 and 7. Under normal operating conditions for an unpolluted airstream, a voltage of 500–800 mV is observed between the platinum electrodes. In the presence of low levels of sulfur dioxide, the voltage drops 20 to 400 mV from its original level, depending on the level of sulfur dioxide present, which signifies the electrochemical oxidation of the sulfur dioxide or other reducible air pollutant at the platinum electrodes. By optimization of the cell operating parameters, it is possible to detect and/or monitor on a real time basis levels of sulfur dioxide or other airborne reducing substances in the range of 0.1 ppm weight/volume or below.

EXAMPLE 2

This example demonstrates the detection and/or monitoring of enzyme inhibiting substances in an airstream. An airstream is drawn into the system as described in example 1 above, a substrate solution consisting of $2 \times 10^{-4}$ M butyrylthiocholine iodide in tris buffer (0.1 M, pH 7.4) is pumped through the system at the rate of 0.1 to 0.3 ml/min from reservoir 3. An electric current of about $2\mu A$ is applied to electrodes 6 and 7 above and below an enzyme pad containing immobilized cholinesterase, such as described in U. S. Pat. No. 3,515,644; the pad having a relatively large amount of open space so that both air and liquid may pass the electrodes simultaneously. The potential of electrodes 6 and 7 is monitored continuously and a characteristic baseline voltage is determined for that situation in which there is no enzyme inhibiting substance present in the atmosphere. When enzyme inhibiting substance, such as organophosphate, is present in the atmosphere there is a rise in cell potential which can be used to trigger an alarm, as described above. This device responds rapidly to low levels of cholinesterase inhibitors, such as G and V agents.

EXAMPLE 3

This example demonstrates the detection and/or monitoring of oxidants, such as ozone, in an airstream. An airstream is drawn into the system as described in example 1 above, and a solution of a reducing solution, such as $2.0 \times 10^{-4}$ M thiocholine iodide, is drawn into the system at the rate of 0.1 to 0.3 ml/min from reservoir 3. Other reducing solutions, such as sodium sulfite, can be used in place of thiocholine iodide solution, and the particular reducing solution is selectable within the skill of the art. An electric current of about $2\mu A$ is applied to platinum electrodes 6 and 7 by circuit 10 above and below open-cell urethane foam pad 5. Low electrode potentials are observed in the absence of an oxidizing substance, such as ozone, and high potentials are obtained in the presence of an oxidizing substance, such as ozone, with the result that this apparatus makes it possible to monitor an airstream on a continuous basis for the presence of low levels of oxidizing susstances.

While examples 1, 2, and 3 are directed to sulfur dioxide, cholinesterase inhibitors, and ozone; our system and method can also be used to detect other reducing substances such as hydrogen sulfide, hydrazine, substituted hydrazine, aldehydes, ketones, nitric oxide, nitrous oxide, and nitrous anhydride; other enzyme inhibiting substances such as chlorine, mercury, lead, hydrogen sulfide, and hydrazine; and other oxidizing substances such as nitrogen tetroxide, nitric oxide, organic peroxides, and $H_2O_2$.

It is obvious that other modifications can be made of our invention, and we desire to be limited only by the scope of the appended claims.

We claim:

1. A system for continuous monitoring of an airstream for the presence of pollutants therein comprising a surveillance program and a declaring program, said surveillance program comprising reservoir means containing an absorbing solution selected from the group of materials consisting of a buffer solution of about pH 8, a substrate solution of $2 \times 10^{-4}$ M butyrylthiocholine iodide in 0.1 M and pH 7.4 tris buffer, $2.0 \times 10^{-4}$ M thiocholine iodide solution and sodium sulfite solution; an inlet means in juxtaposition to the reservoir means to permit the airstream to enter the system; an electrochemical cell adapted to monitor the presence of the pollutants; a conduit having an inside diameter of about 0.070 of an inch connected between the inlet, the reservoir means, and the electrochemical cell to produce turbulence and permit efficient absorption of the pollutants by the absorbing solution; pump means connected within the system at the end opposite to the inlet means to circulate the airstream and absorbing solution through the system; trap means connected between the electrochemical cell and the pump means to collect the absorbing solution after passing through the electrochemical cell; an open-cell material located between an anode and a cathode electrode of the electrochemical cell adapted to permit film flow of the absorbing solution between the electrochemical cell electrodes to permit detection of any pollutant therein, said open-cell material containing an immobilized enzyme; and said declaring program comprising means connected to the electrochemical cell to proclaim the presence of pollutants.

2. The system of claim 1 wherein the means connected to the electrochemical cell is a recording means.

3. The system of claim 2 wherein a plurality of the surveillance programs are connected to the recording means.

4. The system of claim 1 wherein the means connected to the electrochemical cell is a recording means, a flashing light, and an audible alarm.

5. The system of claim 4 wherein a plurality of the surveillance programs are connected to the declaring means.

6. The system of claim 1 wherein the open-cell material is urethane foam.

7. The system of claim 1 wherein at least one electrode is gray platinum.

8. The system of claim 1 wherein the means to proclaim is a flashing light.

9. The system of claim 1 wherein the means to proclaim is an audible alarm.

10. The system of claim 1 wherein an electrical source and an electrical circuit are connected to the anode and the cathode to pass a current of about $2\mu A$ through the circuit.

11. The system of claim 1 wherein the immobilized enzyme is cholinesterase.

* * * * *